July 4, 1933.  R. E. PARIS  1,916,232
RECORD ANALYZING MECHANISM
Filed July 24, 1929   2 Sheets-Sheet 1
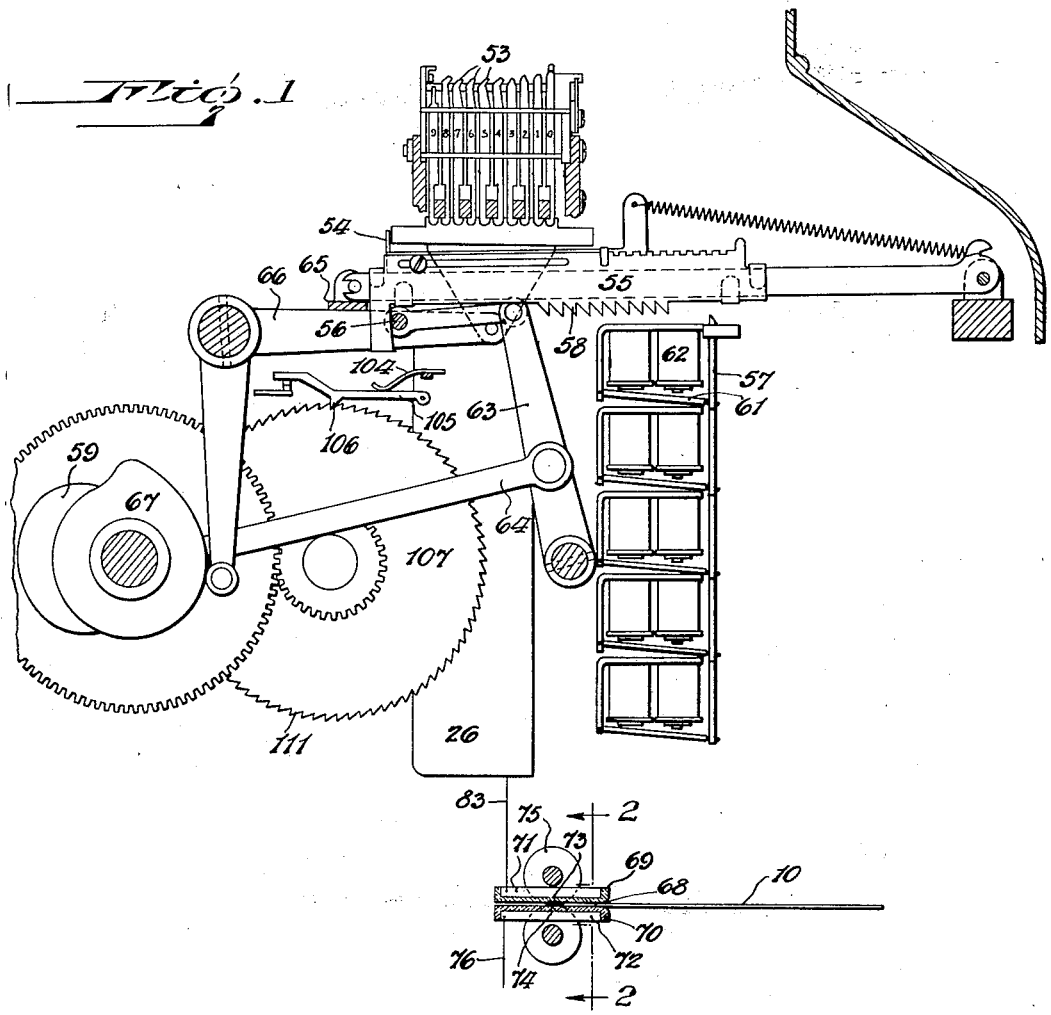
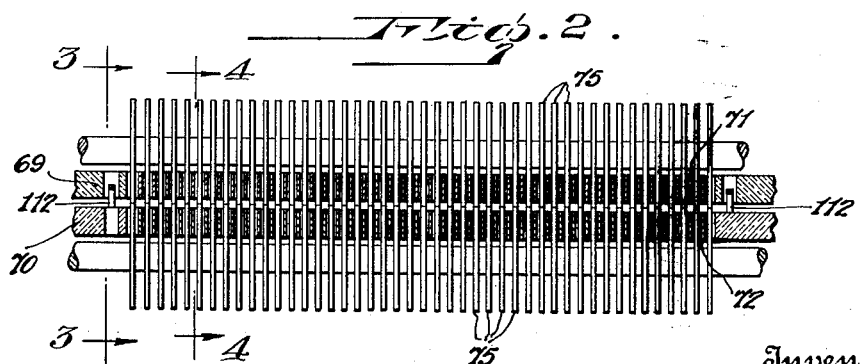
Inventor
Robert E. Paris
By his Attorney W. A. Sparks July 4, 1933.  R. E. PARIS  1,916,232
RECORD ANALYZING MECHANISM
Filed July 24, 1929   2 Sheets-Sheet 2
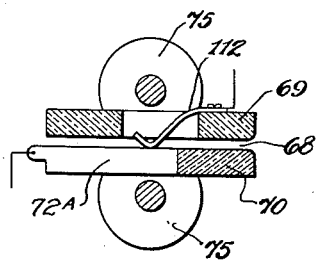
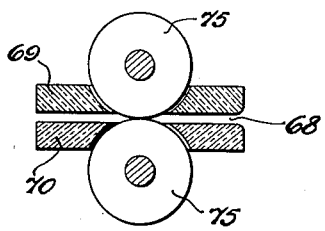
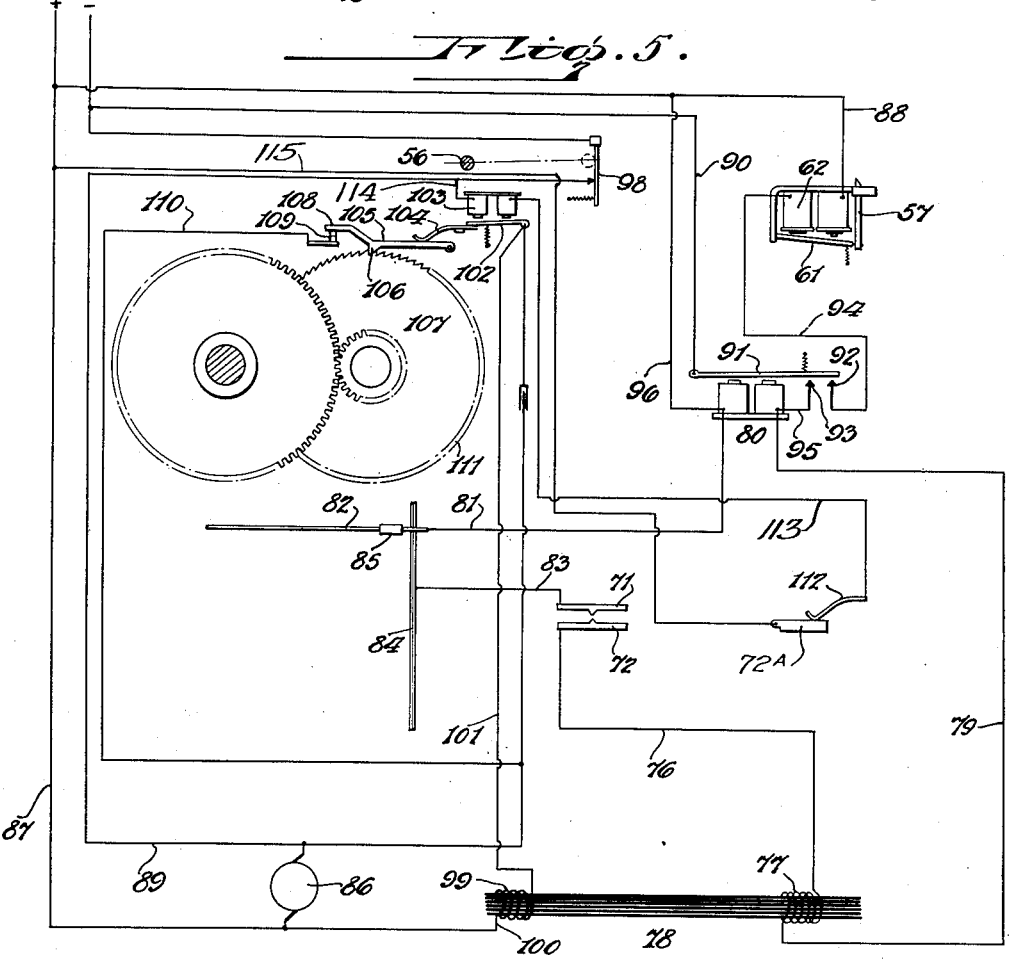
Robert E. Paris  Inventor
By his Attorney  W. A. Sparks Patented July 4, 1933

1,916,232

UNITED STATES PATENT OFFICE

ROBERT E. PARIS, OF NEW YORK, N. Y.

RECORD ANALYZING MECHANISM

Application filed July 24, 1929. Serial No. 380,687.

This invention relates to improvements in record sensing means for card controlled accounting machines and the like, and one object of the invention is to provide sensing means for sensing from minute punctures representing data on the record sheet.

Other objects will appear from the following description and the appended claims. An illustrative example of a mechanism for carrying the invention into effect is shown in the accompanying drawings, in which:

Fig. 1 is a fragmentary vertical sectional view of a tabulator provided with elements of the invention.

Fig. 2 is an enlarged detail section taken on line 2—2 of Fig. 1.

Fig. 3 is a detail section on line 3—3 of Fig. 2.

Fig. 4 is a detail section on line 4—4 of Fig. 2.

Fig. 5 is a wiring diagram for the tabulator.

Like characters of reference refer to like parts in all views.

Although it is conceded that the smaller the hole used in a record, the stronger and more compact the record may be, it has been found impractical in both electrical and mechanical machines, due to limits of interpreting means, to use records having holes smaller than those generally adopted. In the present instance there has been devised a means of utilizing records having minute holes or perforations which is free from the limitations of methods heretofore used.

This type of record and means for interpreting the same is adapted for use in control of a wide range of automatic and semi-automatic machines such as Jacquard looms, accounting machines, etc. I have chosen by way of example to illustrate the invention as used for controlling an accounting machine, though this is not to be considered as limiting the scope of the invention in any way.

Machine accounting has been effected for years by first producing a record card or the like having perforations punched therein, such perforations being of sufficient size to permit the passage of a pin or an electric brush therethrough, whereby sorting and tabulating has been effected. There has also been suggested a means for producing imperforate records by depositing electric conducting material in spots on the surface of the record material and then using a pair of contacts for translating purposes. The present invention differs from both of these methods of producing the record by making minute punctures or perforations through a record sheet to indicate the data, and then passing an electric discharge through these punctures for effecting translation and utilization of the records. The minute punctures may be made in various ways, as by an electric discharge or a needle prick.

In the drawings, I have shown my invention in a machine having many characteristics of what is known on the market as the Powers tabulator. This is, however, merely by way of illustration, and not essential, as the principles involved are susceptible of embodiment in many and various forms all coming within the scope of the invention. Many of the features utilized are also shown in my pending application Ser. No. 324,427, filed December 7, 1928, and in my German Patent No. 524,293, to which reference may be had.

Turning now to the machine for sensing or utilizing the record cards, in machine accounting two such machines are usually employed,—viz, a sorter and a tabulator. Inasmuch as sensing means may be utilized for one of these machines and similar sensing means utilized in the other, I have shown the sensing means as applied to a tabulator only. It will, of course, be understood that the same principle and similar sensing means could be built for translating the record on the cards for use in other machines of automatic or semi-automatic nature such as Jacquard looms.

*Known tabulator mechanism.*—In this connection, attention is first invited to the showing of certain mechanism taken from my application Ser. No. 324,427 which is the same as my German Patent No. 524,293 above referred to. Referring to Fig. 1 of the present specification, 53 represents the usual stops of a Powers tabulator, which stops are selected and raised by denominational fingers 54. Each finger 54 is carried by a respective slide 55, the several slides being spring pressed toward the right, and being controlled in such movement and returned to normal ineffective left-hand position by a reciprocating universal bar 56. The slides 55 may be intercepted at various points in their travel by stops 57 being raised into engagement with teeth 58 on the slides 55, elements 57 and 58 cooperating to stop the respective slides with their fingers 54 under the particular stops 53 determined by the data recorded on the record being sensed.

The stops 57, of which there is one for each slide 55, are carried by respective armatures 61 of magnets 62 operable from the record card in a manner to be hereinafter described. The universal bar 56 is operable by a rock arm or arms 63 connected by a link or links 64 to operating means such as a cam 59 driven from the main operating mechanism of the machine.

When all of the stop-operating fingers 54 have been moved to positions determined by the record, they are all lifted by a universal frame 65 rocked by an arm 66 cooperating with a cam 67 driven from the main operating mechanism of the machine. As fingers 54 are lifted, they raise the desired tabulator stops 53 to control the registering and recording mechanism of the tabulator head in a well known manner.

*Operating the magnets.*—The magnets 62 are energized by means differing from the prior art and from my prior application, and such means will now be described.

In the Powers tabulator as at present on the market, the cards are fed intermittently to a sensing position, then sensed, and then ejected. In the present case, the card is fed through the machine in a single continuous movement and sensed in transit. The card feed rollers and picker knife of the known mechanism are therefore driven in timed relation to the movement of the above described universal bar 56 and slides 55, so as to bring the proper teeth 58 into cooperative relation with stops 57 at the instant that the corresponding digital row of the card is in sensing position.

The card passage is indicated at 68 and is formed by two plates 69 and 70 which are preferably of "Bakelite" or similar insulating material and which hold a plurality of conducting strips 71 and 72 insulated from each other by the substance of the plates. The strips 71 are arranged in the vertical planes of respective strips 72, and are provided with discharge points 73 directly over similar points 74 on strips 72. The points 73 and 74 are substantially at the middle of their strips.

The plates 69 and 70 are cut away at the points 73 and 74 to permit the passage of insulating disks 75 between the points. These disks contact the record and are rotated by the operating mechanism, the several disks being secured to two shafts and taking the place of one pair of feed rollers of the Powers machine. They space the elements 73 and 74 and prevent any possible cross-jump of the electrical discharge.

Each of the strips 72 is connected by a lead 76 to a respective secondary winding 77 (Fig. 5) of a coil 78, the other end of each winding 77 being connected by a lead 79 to one side of a high resistance relay 80. The other side of each relay 80 is connected by a lead 81 to a respective one of the elements 82 of a connection box similar to that of my aforesaid application. Each of the strips 71 is connected by a lead 83 to a respective element 84 of the connection box. Slidable connectors are shown at 85.

It will now be understood that if a puncture of the record is brought between a pair of points 73 and 74 an electrical discharge may pass thru such puncture and according to the set-up of the connection box will operate one or another of the high resistance relays 80.

A source of electric supply is shown at 86 and has its positive line 87 connected by leads 88 to one side of each of the magnets 62. The negative line 89 is connected by leads 90 to the armatures 91 of relays 80. Each armature is provided at its free end with a contactor adapted to engage contacts 92 and 93 when the relay is energized. Contact 92 is connected by a lead 94 to a respective magnet 62, so that when a relay 80 is energized its armature closes the circuit thru the corresponding magnet 62, and the latter instantly raises its stop 57.

*Self circuit for relay.*—The contact 93 is connected to one side of the relay 80 by a lead 95, while a lead 96 connects the other side of the relay to the respective positive lead 88. Consequently, when the relay is energized a circuit is closed from 88 thru 96, the relay, lead 95, contact 93, armature 91 and lead 90 holding the relay operative even after the card has passed controlling position. In order that this circuit may be broken toward the end of the cycle, I provide switch 98 in the line 89 which is opened by universal bar 56 at each operation thereby releasing any armatures 91 which may have been moved to circuit closing position.

*Spark coil connections.*—The primary winding 99 of spark coil 78 is connected at one end by a lead 100 to the positive line 87, and has its other end connected by a lead 101 to the armature 102 of a magnet 103. When the magnet 103 is de-energized its armature 102 brings a contactor 104 into engagement with a vibrator 105. The vibrator 105 is formed with a lug 106 which rides on the periphery of a disk 107 insulated from the rest of the machine and driven from the main operating mechanism of the machine. Member 105 is also formed with a finger 108 cooperatively related to a contact 109 connected by a lead 110 to the negative line 89. The disk 107 is formed with a plurality of lugs or teeth 111 adapted to contact lug 106 and vibrate member 105 so as to break the contact at 108–109, thereby effecting interruption of the circuit thru primary 99. This is necessary to effect electrical discharges.

Rendering spark coil ineffective

It is desirable to throw the coil 78 out of action when no card is being fed between points 73 and 74, and for this purpose I provide two more strips 72 (indicated as 72A), than there are strips 71, and located at opposite ends of the plate 70. Cooperating with these extra strips 72A are spring contactors 112 which contact the extra strips 72A when no record is between plates 69 and 70. When a record is fed between the plates the contactors 112 are raised to ineffective position by the edges of the record. One of the contactors 112 is connected by a lead 113 to one side of the magnet 103, the other side of the magnet being connected to the return by a lead 114. The corresponding extra slip 72A is connected by a lead 115 to the positive line 87. Whenever no record is in cooperative relation to points 73 and 74 the contactors 112 are down and the circuit is closed thru magnet 103 which raises its armature thereby breaking the circuit thru the interrupter and rendering the coil ineffective. Two contactors 112 are used so as to prevent twisting or jamming of the record, altho only one is effective as to magnet 103.

It will be understood that the power of the coils in the tabulator is such that a discharge may occur only when a puncture is in registry with discharge points.

It will also be understood that the record utilized has insulating qualities which will offer resistance to the passage of a discharge of sufficient power to operate the relay 80.

It will now be seen that I propose an entirely new system of utilizing records differing radically from any suggestions of the prior art; also that I have produced a new and desirable form of record as well as means for utilizing the same.

I claim:

1. In a record controlled accounting machine, an analyzer for minutely punctured records comprising a record-analyzing chamber, a plurality of discharge points at one side of said chamber and including a discharge point for each column of the record, a plurality of discharge points arranged at the opposite side of said chamber and including a discharge point for each of the first said discharge points and arranged opposite thereto and constantly separated therefrom, and means for effecting jumping of electric current between respective pairs of discharge points through the minute punctures in the records for analyzing the records.

2. In a record controlled accounting machine, in combination records having minute perforations differentially positioned in a plurality of columns, electric discharge analyzing means therefor, and translating means actuated by said electric discharges for controlling the machine.

3. In a record controlled accounting machine, analyzing means for sensing the record and thus controlling the operation of the machine, including in combination means for sensing an electric discharge only, thru positioned punctures in said record, and means controlled by the discharges for translating them into controlling impulses.

4. In an accounting machine for handling statistical data arranged in a plurality of columns on a record card, means for analyzing said card comprising mechanism for passing an electric discharge only, thru differentially positioned minute perforations therein, and means for utilizing such discharges for controlling the machine.

5. In a card controlled accounting machine, means for sensing the card and controlling machine operation, comprising means for effecting electrical discharges thru perforations so small as to prevent the ready passage therethru of a material sensing element, and means controlled by said discharges for translating them into controlling impulses.

6. In a record controlled computing machine, means for controlling machine operation by analyzing and translating mechanism, comprising the combination of means for passing only electric discharges thru differentially positioned openings in said record, and relay means controlled by said discharges for controlling the computing means.

7. In a record controlled accounting machine, in combination with record feeding means, records having minute perforations differentially positioned in a plurality of columns, electric discharge analyzing means therefor, translating means actuated by said electric discharges for controlling the machine, and an interrupter to control differentially the creation of the electric discharge in timed relation to the record feeding means.

8. In an accounting machine for handling statistical data arranged in a plurality of columns on a record card, means for analyzing said card comprising mechanism for passing an electric discharge only, thru differentially positioned minute perforations in a plurality of said columns, and means for utilizing such discharges for controlling the machine.

9. In a record controlled accounting machine, in combination records having minute perforations differentially positioned in a plurality of columns, electric discharge analyzing means therefor including discharge points, means connected to said discharge points for supplying thereto a current of sufficient electrial tension to bridge the gap between two of said points spaced apart by a record, and translating means actuated by said electric discharges for controlling the machine.

10. In a record controlled accounting machine, in combination records having minute perforations differentially positioned in a plurality of columns, electric discharge analyzing means therefor including a plurality of denominational discharge elements, and translating means actuated by said electric discharges from one or more of said discharge elements for controlling the machine.

In testimony whereof I affix my signature.

ROBERT E. PARIS.